Patented Oct. 2, 1934

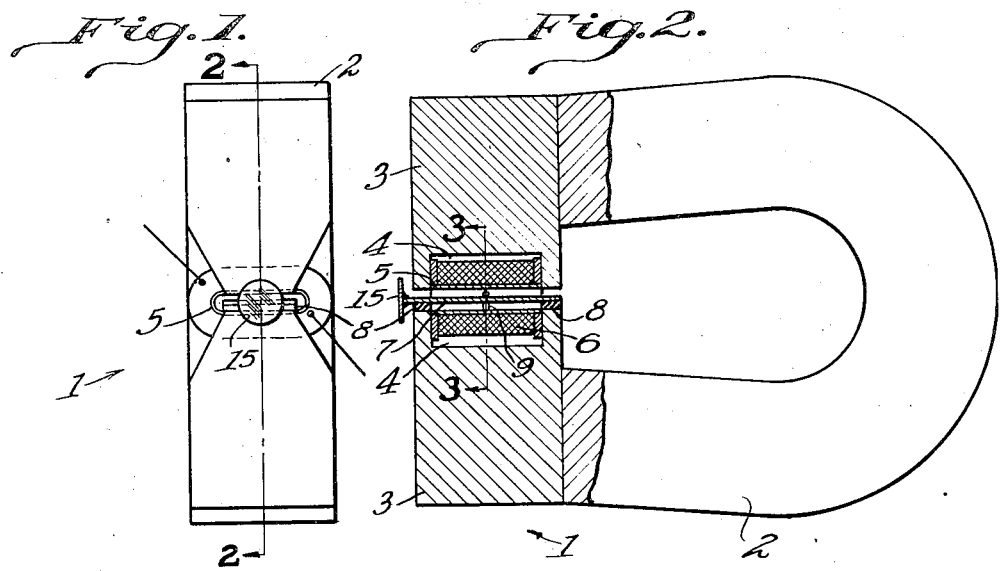
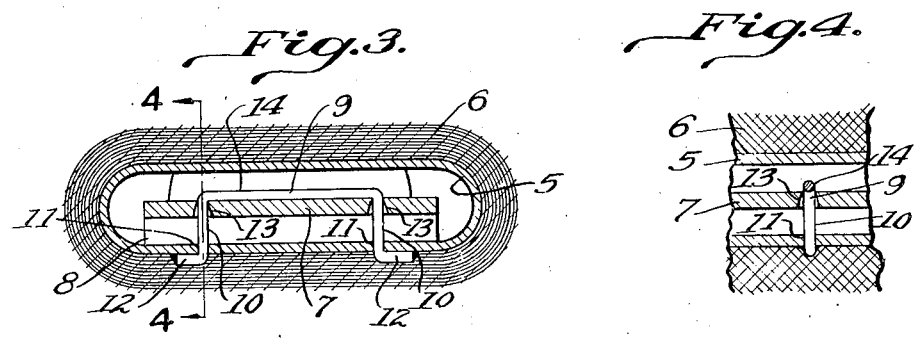
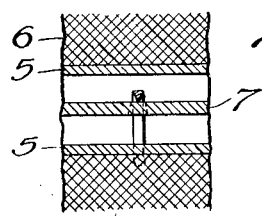

1,975,280

UNITED STATES PATENT OFFICE 1,975,280

MAGNETICALLY OSCILLATED MIRROR

Theodore Lindenberg, Jr., Columbus, Ohio

Application August 7, 1933, Serial No. 683,997

4 Claims. (Cl. 171—95)

This invention relates to improvements in sound photography and has particular reference to an improved magnetically oscillated mirror for use in the variable area system of translating sound impulses into light waves for application on photographic film.

In the variable area method of photographically recording sound, a light beam, emanating from a constant light source, is directed upon a small mirror held in connection with a movable armature arranged in the magnetic field of a sound controlled circuit, whereby the mirror vibrates in accordance with the variations produced in said field and circuit by the exciting sound energy, and whereby the light beam, incident on the surface of said mirror, is reflected and directed through suitable directional and condensing lenses in the form of an attenuated and well defined light pencil on the photographic film, and thereby recorded thereon.

In such sound recording apparatus, to obtain satisfactory reproduction of the photographic sound images, it is of great importance that the magnetic unit for vibrating the mirror should be extremely sensitive and freely and properly responsive to the complex sound variations falling within the entire audible range. Such sensitiveness and responsiveness, heretofore, has been obtained usually with the use of extremely delicate apparatus designed for the recording of sound on film in motion picture studios, laboratories or other establishments where relatively ideal conditions are rigorously maintained to secure the full possibilities of such apparatus.

It is the aim of the present invention, however, to provide an improved mirror vibrating unit by which comparable results in sound photography can be obtained but wherein the unit is adapted, among other uses, for employment in small portable motion picture cameras for use by relatively inexperienced operators or amateurs and wherein the unit is of such construction that it will respond accurately throughout audible limits to the sound excited circuit, yet it will possess the ruggedness and structural simplicity which will admit of its adaptation to non-commercial sound recording cameras and to the film commonly used in connection therewith.

For a further understanding of the invention, reference is to be had to the following description and the accompanying drawing, wherein:

Fig. 1 is a front elevation of my improved magnetically oscillated mirror;

Fig. 2 is a view in vertical section taken through the unit on the plane indicated by the line 2—2 of Fig. 1, a portion of the permanent magnet being shown in side elevation;

Fig. 3 is an enlarged transverse sectional view taken through the armature of the unit on the plane indicated by the line 3—3 of Fig. 2;

Fig. 4 is a detail view on the plane disclosed by the line 4—4 of Fig. 3; and,

Fig. 5 is a similar view of a slightly modified form of the invention.

Referring more particularly to the drawing, the numeral 1 designates my improved mirror vibrating unit in its entirety. This unit is adapted for employment in apparatus for recording sound on photographic film, wherein the so-called "variable area" method is utilized.

In order to produce a rugged yet highly sensitive unit for out-of-door sound motion picture cameras falling in this general category, the unit 1 comprises a permanent magnet 2 terminating in spaced poles 3. The adjoining surfaces of the poles 3 are recessed as at 4 for the accommodation of the frame 5 of the windings of a coil 6, the latter constituting a part of a microphonic sound excited circuit.

Arranged within the frame 5 and disposed between the poles of the magnet 2 is an armature 7 which, in this instance, partakes of the form of a flat and relatively thin strip of metal which rests normally upon a pair of spaced resilient supports 8, carried by one of the poles 3, the said supports being preferably formed from rubber. The armature is normally maintained in contact with the rubber supports or pads 8 by means of a transversely disposed bail 9. This bail includes vertical legs 10, which pass through openings 11 formed in the frame 5 and terminate at their lower ends in out-turned portions 12. The upper parts of the legs 10 pass through substantially conical openings 13 formed in the armature 7 and the upper portions of said legs are united by a horizontal fulcruming portion 14. The outer end of the armature carries a small, light weight plane mirror 15 on which a light beam from a suitable light source (not shown) is directed and by the operation of the mirror reflected upon the film on which the light and/or sound record is produced.

The bail 9 holds the ends of the armature positively in firm engagement with the resilient support or dampening pads 8 so that vibration of the armature and its associated mirror due to handling or other extraneous mechanical forces is rendered negligible. However, upon the exciting of the magnetic field in which the armature is situated through the microphonic circuit, the armature vibrates or turns readily in compliance with the magnetic forces of attraction applied thereto to effect the desired controlled oscillation of the mirror 15. The bail 9 serves as a fulcrum about which the relatively rigid armature is permitted to turn, one or the other of the pads 8 being compressed when the armature turns from its normal position. It is within the scope of the invention to apply the pads to both sides of the armature instead of to merely one side thereof as indicated. Also, the portion 14 of the bail 9 for friction minimizing purposes may possess the knife edge configuration disclosed in Fig. 5 in lieu of the circular form shown in Fig. 4. I have found in practice that the armature responds sensitively to sound cycles bearing between twenty to ninety-five hundred and over frequency without encountering sound shattering peaks or uncontrolled vibrational periods which have such a detrimental effect upon the recorded or reproduced sound. It will be noted that the conical openings 13 permit of the desired turning movement of the armature about the fulcruming portion of the bail within the operative limits of the armature.

What is claimed is:

1. In a magnetically vibrated mirror unit for recording sound on film, the combination with a permanent magnet and its spaced pole pieces, of a coil positioned in registering recesses formed in said pole pieces, a mirror carrying armature positioned between said pole pieces and surrounded by said coil, resilient pads arranged to contact with the opposite ends of said armature, and a bail carried by said coil and cooperative with said armature to maintain the latter constantly in contact with said pads and admit of turning movement of said armature about an axis provided by said bail.

2. In a magnetically vibrated mirror unit for sound on film apparatus, the combination with a permanent magnet and its spaced pole pieces, the said pole pieces being provided with registering recesses, of an electro-magnet comprising a spool frame and coil windings arranged to occupy said recesses, a bail member carried by said spool frame, of a mirror carrying armature provided centrally with conical openings through which the spaced legs of said bail pass to effect the support of the armature, and resilient dampening pads cooperative with the ends of said armature and serving to maintain the latter in constant engagement with said bail.

3. A magnetically vibrated mirror unit for sound on film recording apparatus, comprising a permanent magnet having spaced pole pieces, said pieces being provided with registering recesses, an electro-magnet comprising a frame and coil windings arranged to occupy said recesses, a bail member carried by said frame, a mirror bearing armature provided with conical openings for the reception of the spaced legs of said armature, and resilient pads positioned between one of the pole pieces and said armature and forming the only means for maintaining the latter in engagement with said bail.

4. A magnetically oscillated mirror unit for sound on film recording apparatus, comprising a permanent magnet and its spaced pole pieces, said pieces being provided with registering recesses, an electro-magnet having a frame and coil windings arranged to occupy said recesses, a mirror carrying armature arranged within said frame, a bail rigidly carried by said frame and having a knife edge contact with said armature, and resilient means for maintaining the latter in engagement with said bail.

THEODORE LINDENBERG, Jr.